US007840601B2

(12) United States Patent
Bicker et al.

(10) Patent No.: US 7,840,601 B2
(45) Date of Patent: Nov. 23, 2010

(54) EDITABLE TABLE MODIFICATION

(75) Inventors: Sandra Bicker, Heidelberg (DE); Iris Nieder, Walldorf (DE); Annett Hardt, Mannheim (DE); Ingo Deck, Mannheim (DE); Erik Oster, Heidelberg (DE); Till Brinkmann, Mannheim (DE); Boris Bierbaum, Frankfort/Main (DE); Martin Dauer, Alsting (FR); Theo Held, Wiesloch (DE); Martin Schrepp, Hockenheim (DE)

(73) Assignee: SAP AG, Walldorf (DE)

( * ) Notice: Subject to any disclaimer, the term of this patent is extended or adjusted under 35 U.S.C. 154(b) by 275 days.

(21) Appl. No.: 11/688,224

(22) Filed: Mar. 19, 2007

(65) Prior Publication Data

US 2007/0266331 A1 Nov. 15, 2007

Related U.S. Application Data

(60) Provisional application No. 60/800,055, filed on May 12, 2006.

(51) Int. Cl.
*G06F 17/005* (2006.01)

(52) U.S. Cl. .................. 707/795; 707/791; 707/792; 707/793

(58) Field of Classification Search .................. 707/1–10
See application file for complete search history.

(56) References Cited

U.S. PATENT DOCUMENTS

| | | | | | |
|---|---|---|---|---|---|
| 5,553,218 | A | * | 9/1996 | Li et al. | 707/102 |
| 5,792,659 | A | * | 8/1998 | Janay et al. | 715/744 |
| 6,003,026 | A | * | 12/1999 | Bonzi | 707/4 |
| 6,078,920 | A | * | 6/2000 | Tan et al. | 707/10 |
| 6,510,468 | B1 | * | 1/2003 | Hayne | 709/246 |
| 7,246,111 | B1 | * | 7/2007 | Chaware et al. | 707/3 |
| 2003/0187850 | A1 | * | 10/2003 | Reed et al. | 707/10 |
| 2004/0107088 | A1 | * | 6/2004 | Budzinski | 704/10 |
| 2005/0083872 | A1 | * | 4/2005 | Kubler et al. | 370/328 |
| 2006/0026154 | A1 | * | 2/2006 | Altinel et al. | 707/5 |
| 2008/0215580 | A1 | * | 9/2008 | Altinel et al. | 707/5 |

OTHER PUBLICATIONS

J.D. Meier, "Chapter 12—Improving ADO.Net Performance", Microsoft, 2004.*

(Continued)

*Primary Examiner*—Mohammad Ali
*Assistant Examiner*—Sheryl Holland
(74) *Attorney, Agent, or Firm*—Fish & Richardson P.C.

(57) ABSTRACT

In a computing system, a communication that includes contents retrieved from a data repository and configured to be organized in a table is received from a second device. The received contents are displayed in the table on a user interface. The table includes multiple rows, one of which is configured to remain empty while the table is displayed to indicate a possibility of adding a new row to the table. While the table is displayed, a user input that indicates the empty row and is configured to trigger the new row to be added to the table is received. The new row is added to the table without first communicating with the second device regarding the addition. The new row is configured so that new contents entered into the new row are to be added to the data repository in a subsequent communication to the second device.

16 Claims, 13 Drawing Sheets

OTHER PUBLICATIONS

"Micro Focus—Enterprise Server and Direct COBOL Web Services", 2003, Micro Focus.*

"Micro Focus—Web Services and Micro Focus COBOL", 2001, Micro Focus.*

'Input Enabled ALV Grid Control (Business Content-SRV-ALV)' [online]. SAP AG, [retrieved on Mar. 19, 2007]. Retrieved from the Internet: <URL: http://belp.sap.eom/saphelp_webas630/helpdata/en/df/ef7f380c2f2e3ce10000009b38f8cf/frameset.htm>, 4 pages.

'SAP List Viewer (ALV) Grib Control (BC-SRV-ALV)' [online]. SAP AG, [retrieved on Mar. 19, 2007]. Retrieved from the Internet: <URL: http://help.sap.com/saphelp_webas630/helpdata/en/8d/e994374c9cd355e10000009b38f8cf/frameset.htm>, 2 pages.

* cited by examiner

| | | | | | |
|---|---|---|---|---|---|
| Home | | Search: Account | | Help Log Off | |
| Calendar | | | | Saved Searches ▢ ▶ | Go Edit |
| Marketing >> | | | | | Hide Search Fields |
| Accounts >> | | Name ▶ | Is ▶ | Company A | ＋ |
| Products >> | | Country ▶ | Is ▶ | United States | ＋ |
| Activities >> | | Postal Code ▶ | IS BETWEEN ▶ | 12000 and 25000 ▢ | ＋ 402 |
| Search ▢ Go | | Postal Code ▶ | IS BETWEEN ▶ | 45000 and 65000 | ＋ |
| Create: | | Number of Results ▢ | | | 502 |
| ▶ Appointment | | Search Clear | | Save Search As ▢ | |
| ▶ Email | | Result List | | | 404 |
| ▶ Task | | | | | |
| ▶ Contact | | | | | |

| Name | Account ID | Postal Code | Country |
|---|---|---|---|
| Company A | 7789 | 12500 | United States |
| Company A | 7790 | 16455 | United States |
| Company A | 7850 | 24500 | United States |
| Company A | 7750 | 46542 | United States |
| Company A | 7720 | 55386 | United States |
| Company A | 4450 | 55317 | United States |
| Company A | 4469 | 62104 | United States |
| Company A | 5521 | 64325 | United States |

504, 506, 508, 510, 512, 514, 516, 518

500

| | | | | |
|---|---|---|---|---|
| Home | | | | Help Log Off |
| Calendar | | | | |
| Marketing >> | | Search Criteria | | Saved Searches ▶ Go Edit |
| Accounts >> | | | | Hide Search Fields |
| Products >> | | Name ▶ | IS ▶ | 602 |
| Activities >> | | ID Number ▶ | CONTAINS ▶ | ⊞ 606 |
| Search | | Country ▶ | IS ▶ | ⊞ ⊟ 608 |
| [ Go ] | | Qualification ▶ | IS ▶ | ⊞ ⊟ 610 |
| Create: | | | C++ Programming 613 | with Proficiency High ▶ ⊟ 622 624 |
| ▶ Appointment | | 614 Search Clear | | Number of Results Save Search As |
| ▶ Email | | Result List | | 604 |
| ▶ Task | | | | |
| ▶ Contact | | | | |

| Name 616 | ID Number 618 | Country 620 | Qualification | Proficiency |
|---|---|---|---|---|
| Person A | 1234 | Germany | C++ Programming | High |
| Person B | 2256 | Germany | C++ Programming | High |
| Person C | 9856 | Germany | C++ Programming | High |
| Person D | 7875 | United States | C++ Programming | High |
| Person E | 3256 | United States | C++ Programming | High |
| Person F | 3354 | India | C++ Programming | High |
| Person G | 3358 | India | C++ Programming | High |

FIG. 6

| | Help Log Off | |
|---|---|---|
| Home | Saved Searches ▶ | |
| Calendar | | Hide Search Fields |
| Marketing >> | Search Criteria — 904 | 902 |
| Accounts >> | Campaign ID ▶ is ▶ [ ] [+] [ ] | |
| Products >> | Campaign Desc ▶ is ▶ BB* [+] [ ] — 910 | |
| Activities >> | Start Date ▶ is ▶ [ ] [+] | |
| Search [ ] [Go] | — 906 — 908 | |
| | [Search] [Clear] Number of Results [ ] Save Search As [ ] | |
| Create: | Result List | 912 |
| ▶ Appointment | | |
| ▶ Email | Campaign ID | Campaign Desc | Start Date | Status |
| ▶ Task | ▲ BB-329 | BB-Campaigns | 11/21/05 | Created, Published |
| ▶ Contact | BB-518 | BB-Campaigns | 2/24/06 | Active |
| | 914 | | | |

FIG. 7

| | | Help Log Off |
|---|---|---|
| Home | | ▼ Back |
| Calendar | |
| Marketing >> | Campaign: BB-329, BB-Campaigns - Products — 925 |
| Accounts >> | — 924 |
| Products >> | [Insert] |
| Activities >> | |
| Search [ ] [Go] | |
| Create: | |
| ▶ Appointment | |
| ▶ Email | |
| ▶ Task | |
| ▶ Contact | |

Campaign table:

| Product ID | Product Desc | Unit | Product Group | Category |
|---|---|---|---|---|
| HT-1010 | Easy Hand I | PC | | 0014259 |
| HT-1020 | Easy Hand II | PC | | 0016895 |
| HT-1030 | Easy Hand III | PC | | 0015523 |
| HT-1040 | Notebook Pro I | PC | | 0011284 |
| HT-1050 | Notebook Pro II | | | 0019751 |
| HT-1060 | Notebook Pro III | PC | | 0018898 |
| HT-1070 | Desk Pro | PC | | 0016614 |
| 928 | 930 | | 932 | |
| | | | | [Save] 922 |

EDITABLE TABLE MODIFICATION

CROSS-REFERENCE TO RELATED APPLICATIONS

This application claims priority from U.S. Provisional Application No. 60/800,055, filed May 12, 2006, and entitled "UI Concept," the entire contents of which are incorporated herein by reference.

TECHNICAL FIELD

This document relates to modifying an editable table in an electronic computing system.

BACKGROUND

Electronic storage of business information has become ubiquitous in today's business environment. Advances in electronic storage technology have made feasible the storage of vast amounts of electronic information as ever-larger storage capacity devices are introduced. In particular, as electronic storage densities increase and the cost of electronic storage decreases, businesses are eagerly adopting comprehensive electronic storage procedures for storing their business information. Additionally, the proliferation and widespread acceptance of electronic business transactions and communications has fueled significant demand for voluminous electronic storage capacity. Typically, businesses will store electronic information in electronic storage devices, often referred to as data repositories or data stores. A server device can store and maintain a database of electronic information in a data repository, and can communicate with other computing devices to share the electronic information with the other computing devices. For example, a user of a computing device, such as a laptop or desktop computer, may enter search criteria for searching a database, the computing device may communicate the search request to the server device, the server may formulate a query to search the database, and may communicate the results to the computing device for presentation to the user. The server device may control the addition, deletion, or modification of electronic information stored in the database.

Graphical user interfaces may be used to present database information to computer-system users. Because databases often contain large amounts of data, a sensible presentation scheme is desirable. One way of displaying database information to a user is to display a table of rows of data, where each row, or record, in the table represents a set of related data, and where each row in the table has the same structure. Tables can be read-only, meaning that the user is permitted to view the information in the table but is not permitted to modify the table or information in the table. Alternatively, tables can be editable, in which case a user may modify, add or delete information from the table. In one example, a user wishing to add a record of data to the table clicks on an "Add Row" selection button in the graphical user interface to add a new row to the table. In another example, a user first selects an "Insert" menu bar item to add a new row to the table. In each example, the user can then enter data into the new row. However, the user may find it disruptive to perform these additional actions, which may interrupt the user's flow in working with the database information and may adversely affect the user's ability to quickly add new data to the table.

SUMMARY

This document relates to modifying an editable table in an electronic computing system without communicating with a remote device.

In a general aspect, a method includes receiving a communication at a first device from a second device. The communication includes contents configured to be organized in a table, where the second device retrieved the contents from a data repository. The method also includes displaying the received contents in the table on a user interface of the first device. The table includes multiple rows, and one of the rows is configured to remain empty while the table is displayed to indicate a possibility of adding at least one new row to the table. The method further includes receiving, while the table is displayed, a user input made by performing an operation in the user interface that indicates the empty row. The user input is configured to trigger the new row to be added to the table. The method further includes adding the new row to the table in response to the user input. The new row is added without first communicating with the second device regarding the addition, and the new row is configured so that new contents entered into the new row are to be added to the data repository in a subsequent communication to the second device.

In selected embodiments, the new row may be created by a script executing on the first device. The user input that indicates the empty row may be a selection of a field within the empty row, a tab into the empty row, or a data keystroke entry within the empty row. The new contents may be received into the new row and the subsequent communication to the second device may be sent. The subsequent communication may include the new contents. The subsequent communication may be sent to the second device in response to receiving a user input made by performing an operation in the user interface. The user input may be received after the new contents have been received into the new row. The user input may indicate storing the table or navigating away from the table.

In a second general aspect, a computer program product tangibly embodied in an information carrier includes instructions that when executed by a processor receive a communication at a first device from a second device. The communication includes contents configured to be organized in a table, where the second device retrieved the contents from a data repository. When executed, the instructions also display the received contents in the table on a user interface of the first device. The table includes multiple rows, and one of the rows is configured to remain empty while the table is displayed to indicate a possibility of adding at least one new row to the table. When executed, the instructions further receive, while the table is displayed, a user input made by performing an operation in the user interface that indicates the empty row. The user input is configured to trigger the new row to be added to the table. When executed, the instructions further add the new row to the table in response to the user input. The new row is added without first communicating with the second device regarding the addition, and the new row is configured so that new contents entered into the new row are to be added to the data repository in a subsequent communication to the second device.

In a third general aspect, a graphical user interface for modifying an editable table without communicating with a remote device includes a table. The table includes multiple rows of data received in a communication from a second device, where the data was retrieved from a data repository by the second device. The table also includes a row configured to remain empty while the table is displayed to indicate a possibility of adding at least one new row to the table. The graphical user interface is configured to receive, while the table is displayed, a user input made by performing an operation in the user interface that indicates the empty row, and add a new row to the table in response to the user input without first communicating with the second device regarding the addition. The new row is configured so that new contents entered into the new row are to be added to the data repository in a subsequent communication to the second device.

Advantages of the systems and techniques described herein may include any or all of the following: data may be added to an editable table quickly in an efficient manner; productivity may be improved; extraneous user interface actions may be avoided; data entry errors may be reduced; server roundtrips may be reduced, which may increase performance; data capture accuracy may be improved; a more enjoyable and more intuitive user interface may be provided.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 shows an exemplary user interface that can be used for searching over a range of values in a single search statement.

FIG. 5 shows an exemplary user interface that can be used for searching over multiple ranges of values.

FIG. 6 shows an exemplary user interface that can be used for searching with combined search attributes.

FIG. 7 shows an exemplary user interface that can be used for searching a data repository in a computing system.

FIG. 8 shows an exemplary user interface that can be used for presenting an editable table of information.

Like reference symbols in the various drawings indicate like elements.

DETAILED DESCRIPTION

Figure 1:
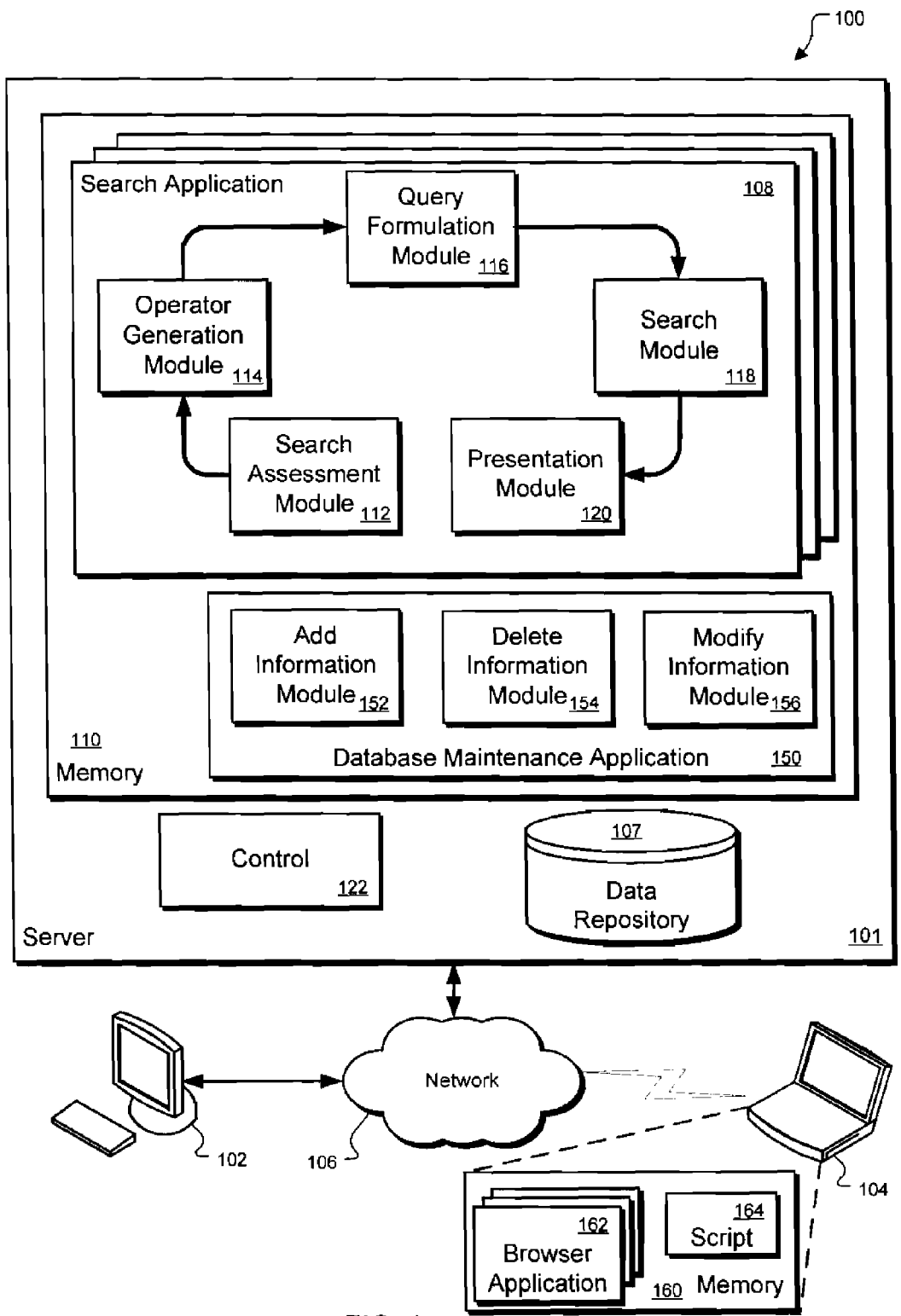
FIG. 1 is a block diagram of an exemplary architecture that can be used in a computing system to maintain a database of information and present data from the database at a remote location.

FIG. 1 is a block diagram of an exemplary architecture 100 that can be used in a computing system to maintain a database of information and present data from the database at a remote location. Using the architecture shown in FIG. 1, a user may enter on a first device input search criteria pertaining to a desired database search to be performed by a second device, and the architecture may assess the input criteria to formulate a database search query. Search results may be presented to the user in table format on a display of the first device. Certain tables containing database information may be editable, and the user may wish to add one or more records to such a table.

In an implementation, an editable table may include multiple rows, or records, containing content from the database, and one of the rows may be configured to remain empty while the table is displayed. By remaining empty, the row may indicate a possibility of adding at least one new row to the table. The user may provide input by performing an operation that indicates the empty row, and the input may be configured to trigger a new row to be added to the table. The new row may be added to the table without first communicating with the second device regarding the addition, and the new row may be configured so that new contents entered into the new row are to be added to the data repository in a subsequent communication to the second device. In this fashion, a user may quickly and easily add one or more new records to a table of database information. The user may thus add a row to the table without making an unnecessary action within the user interface, such as a selection of one or more buttons or a menu items, which may increase productivity and efficiency. Performance may also be increased as server roundtrips may be reduced, as will be described in more detail below with respect to FIGS. 7-12.

Referring again to search criteria that a user may enter on a first device, the entered input search criteria may not include any logical operators that operate on the search criteria, nor any grouping operators or elements that operate on the search criteria or logical operators, according to an implementation. The input search criteria may be as complex or as simple as desired, and may include repeated criteria instances directed to different search aspects. For example, the search criteria may include multiple instances of the same attribute, where the entered search criteria specifies a different attribute value for each instance of the same attribute. The architecture may automatically generate and incorporate appropriate logical operators with the search criteria to form a database search query, and this may occur in a transparent manner from the perspective of a system user. Similarly, grouping operators or elements may be automatically generated and incorporated with the logical operators and search criteria in formation of the database search query. In this fashion, the user may be spared the responsibility of understanding and entering such logical operators and grouping operators, while still realizing a powerful and effective search query formulation, database search, and search results presentation, which may facilitate a user-friendly and enjoyable search experience.

In general, a user may input search criteria into a graphical user interface having search capabilities on a server device 101 included in the architecture 100. The architecture 100 may construct a query to generate search results for presentation in one or more client devices 102, 104 over a network 106. In some implementations, the user may enter or select one or more attributes in the user interface to obtain search results. An attribute may be, for example, an account name, a postal code, an employee name, a country, a qualification, an identification number, or various other business entities that may be found in an enterprise resource computing system. Attributes are generally related to one or more business objects included in a data repository 107. Business objects may represent a specific view on some well-defined business content, and may include attributes and associated values. Examples of business objects that can be stored in the data repository 107 include accounts, products, activities, sales orders, service orders, leads, opportunities, contact persons, campaigns, target groups, and marketing plans. The business object list above is not all-inclusive and, as such, other business objects and content may be present in the data repository 107. In some implementations, the data repository 107 may be included in the server 101. In other implementations, the repository 107 may be external to the server 101. In yet other implementations, one or more searchable data repositories may be included in the server 101.

The architecture 100 includes various software applications, such as a search application 108 and a database maintenance application 150, that are generically shown residing in memory 110 on the server device 101. The applications may be stored in a nonvolatile storage location, such as the repository 107 or another repository, including a data store exterior to the server 101, and may be transferred to memory 110 for active use by the architecture 100. The search application 108 includes several modules capable of assessing input search criteria, generating and configuring search operators, formulating queries using input search criteria and generated operators, performing database searches, and presenting search results in the system. The modules in this example include: a search assessment module 112, an operator generation module 114, a query formulation module 116, a search module 118, and a presentation module 120.

The architecture 100 may use the search assessment module 112 to analyze search statements. Search statements may include input search criteria as well as search information initially presented to a user, in which initial information may have been previously configured, for example, during the system installation. This analysis may include determining which, if any, of the search statements, or query portions, share common attributes, and categorizing those search statements having common attributes into groups. In some examples, there may be one, two, three, or more groups of search statements, where each search statement in a particular group includes a common attribute.

In forming a search query for searching a database, logical operators may be used to specify a defined relationship among the search statements. The architecture 100 may use the operator generation module 114 to seamlessly generate logical operators and include them automatically, without requiring user input involving logical operators, and without providing user notice that such logical operator incorporation is occurring. Examples of logical operators that may be generated include a logical AND operator, a logical OR operator, a logical EXCLUSIVE OR operator, a NEGATION operator, or any other type of Boolean operator. Additionally, logical grouping elements may be used to organize and assign relationships among the search statements and the logical operators. The architecture 100 may further use the operator generation module 114 to seamlessly generate logical grouping elements and include them automatically without requiring user input. Examples of logical grouping elements include parentheses, brackets, braces, etc., including elements of any appropriate complexity for nesting search statements, groups of search statements, operators, or combinations thereof.

While a search query may be formulated by combining search statements and generated logical operators and grouping elements, search statements themselves may also be formulated. For example, when the search assessment module 112 completes an analysis of a particular search statement, the architecture 100 may use the query formulation module 116 to formulate one or more search statements. A search statement may include an attribute, a search associator, and one or more fields of input search criteria, some or all of which can be used to formulate the search statement. For example, some search statements may be formulated to include an attribute and a search associator, such as when the search associator is defined as "is empty." In this example, the search query may be performed to locate business information having an attribute that has an empty field. Thus, the search requester need not include further input search criteria to formulate the search statement. In general, the search associator may define a relationship between the attribute, which may be entered or preselected, and an associated input search criterion. For example, a search statement may include the attribute "last name," the search associator "IS," and the search criterion "Smith," where a user wishes to search for all business objects having the last name of "Smith." The query formulation module 116 may combine the three entities and create the search statement used to perform the search query. In some implementations, additional search criteria may be added by the query formulation module 116, for example, by adding similar spellings of "Smith," such as lowercase and uppercase versions of the entered criterion.

After formulating the search query, the architecture 100 may use the search module 118 to perform a search using the formulated search query. In general, the search may be performed on one or more data repositories, but may be narrowed to a select few data repositories by the user, or by a function in the architecture 100. For example, the search query may trigger a search of a specific database based on the selected attribute or entered criteria. In some implementations, searches may be performed on all available data repositories. Also, in some implementations, the search query may not specify the database to be searched.

Search results may be returned to the user in various ways. In one implementation, the search results may be presented in list form in the requesting application. In another implementation, the search results may be emailed to the user. In yet another implementation, the results may be stored in a repository 107 for later access, whether by a user or by a software application. The architecture 100 may use the presentation module 120 to present the search results. The presentation module 120 may organize search results for display, storage, or emailing. The search results may include links, objects, text, images, help content, and other search content that may or may not be selectable by the user. In some implementations, a link within the search results may be selected by a user, and the architecture 100 may present an editable table of content. The search results may also be modifiable by the user, as will be discussed in more detail below.

The search results may be displayed on a display or monitor of the client device 102 or 104. For example, the monitor may display the search results above, beneath or beside the entered search statement in the application 108. In some implementations, the search results or tables of data including all or portions of the search results may be displayed in a separate application, such as a word processing application, web browser, or other system application. In addition to or in lieu of being displayed, the search results may be stored, and in some implementations, may be used as input to another application in the system 100. In some implementations, the search results may be sent to a laptop, personal digital assistant (PDA) or other system device that may have requested the original search, or simply requested a copy of the search results. In some implementations, the search results may be emailed to a group of individuals.

The architecture 100 includes or is communicably coupled with the server 101, the one or more client systems 102, 104, and control devices 122, at least some of which can communicate across network 106. The server 101 comprises an electronic computing device operable to receive, transmit, process and store data associated with the architecture 100. Although FIG. 1 illustrates a single server 101 that may be used with the disclosure, the architecture 100 may be implemented using one or more computers other than servers, as well as a server pool. The server 101 may be any computer or processing device, such as, a blade server, general-purpose personal computer (PC), Macintosh, workstation, Unix-based computer, or any other suitable device. According to one implementation, the server 101 may also include or be communicably coupled with a web server and/or a mail server.

The server 101 may include local electronic storage capacity, such as data repository 107. The data repository 107 may include any memory or database module and may take the form of volatile or non-volatile memory including, without limitation, magnetic media, optical media, random access memory (RAM), read-only memory (ROM), removable media, or any other suitable local or remote memory component. The illustrated data repository 107 may store system data such as search results, virtual private network (VPN) applications or services, firewall policies, a security or access log, print or other reporting files, HTML files or templates, data classes or object interfaces, unillustrated software applications or sub-systems, and others.

The database maintenance application 150, shown in memory 110 of the server 101, generally may maintain one or more databases of information, which may be stored, for example, in the data repository 107 or another repository. The database maintenance application 150 includes an "Add Information" module 152, a "Delete Information" module 154, and a "Modify Information" module 156. The add information module 152 may be used to add new information to the database, such as one or more new records or database objects. The delete information module 154 may be used to delete information from the database, such as one or more records or database objects, and the modify information module 156 may be used to modify existing information in the database, such as information associated with one or more records or database objects. In an implementation, a user working on a computing device, such as client device 104, may request that a new record be added to a database that the server 101 maintains using the database maintenance application 150. The client device 104 may transmit the request over the network 106, and the server device 101 may receive the request. The request may include content associated with the requested new record, such as content that the user entered in a user interface on the client device 104. The add information module 152 may then appropriately add the information to the database, including creating a new record in the database with the received content, and may update any relationships defining database organization, as appropriate. Similarly, the user may request that one or more records be deleted from the database, or that one or more existing records be modified, including providing requested modifications. The server 101 may receive such a request and the database maintenance application 150 may use the delete information module 154 or the modify information module 156, respectively, to perform the requested tasks on the data repository 107.

The server 101 also includes one or more control devices 122. The control devices 122 may include one or more processors to execute instructions and manipulate data for performing the operations of the server 101. The control devices 122 may include, for example, a central processing unit (CPU), a blade, an application specific integrated circuit (ASIC), a field-programmable gate array (FPGA), or other suitable hardware or software control system. In the illustrated implementation, the control devices 122 execute instructions that comprise the server software applications 108, 150, etc. The components, modules, and applications on the server 101 can be combined or separated in various manners, or distributed over several devices, according to some implementations.

The network 106 may facilitate wireless or wireline communication between the server 101 and any other local or remote computers, such as clients 102 and 104. The network 106 may be all or a portion of an enterprise or secured network. In another example, the network 106 may be a VPN between the server 101 and the client 102, 104 across a wireline or a wireless link. While illustrated as a single or continuous network, the network 106 may be logically divided into various sub-nets or virtual networks without departing from the scope of this disclosure, so long as at least a portion of the network 106 may facilitate communications between the server 101 and at least one client (e.g., client 104). In certain implementations, the network 106 may be a secure network associated with the enterprise and certain local or remote clients 102, 104. The network 106 may be the Internet, or a portion thereof.

The client 102 or 104 may be any computing device operable to connect or communicate with the server 101 or the network 106 using any communication link. At a high level, each client 102 or 104 may include or execute at least one hosted application graphical user interface. Applications residing on the server may be accessed and executed by client devices 102 or 104, according to some implementations. There may be any number of clients 102 or 104 communicably coupled to the server 101. As an example, the client 102 or 104 is intended to encompass a personal computer, touch screen terminal, workstation, network computer, kiosk, wireless data port, smart phone, PDA, one or more processors within these or other devices, or any other suitable processing device. For example, the client 102 or 104 may be a PDA operable to wirelessly connect with an external or unsecured network. Hereafter, references to client devices 102 or 104 will refer to device 104 for simplicity.

The client device 104 includes memory 160 that may take the form of volatile or non-volatile memory including, without limitation, magnetic media, optical media, random access memory (RAM), read-only memory (ROM), removable media, or any other suitable local or remote memory component. Various program applications may be stored in client memory 160, including a browser application 162. The browser application 162 can be used to display and interact with text, images, and other information that may be supplied by the server 101 over the network 106, for example. Using the browser application 162, the client device 104 may communicate with the server 101 using HTTP (hypertext transfer protocol), as an example, or any other suitable communications protocol. In an implementation, the client 104 also includes one or more script programs 164 that may execute locally on the client 104. In some implementations, a script 164 may execute on the client 104 in response to an input received at the client 104 and independent of activity or communications with the server 101.

In one implementation, the users of one or more of the applications shown residing on server 101 in FIG. 1 may include sales personnel, customer service personnel, field applications personnel, repair or installation personnel, or any other user of business information. The following exemplary descriptions of screen shots focus on the operation of the applications, or one or more components or sub-modules, in performing one of the exemplary methods or processes. However, the architecture 100 can use any appropriate combination and arrangement of logical elements implementing some or all of the described functionality.

Figure 2:
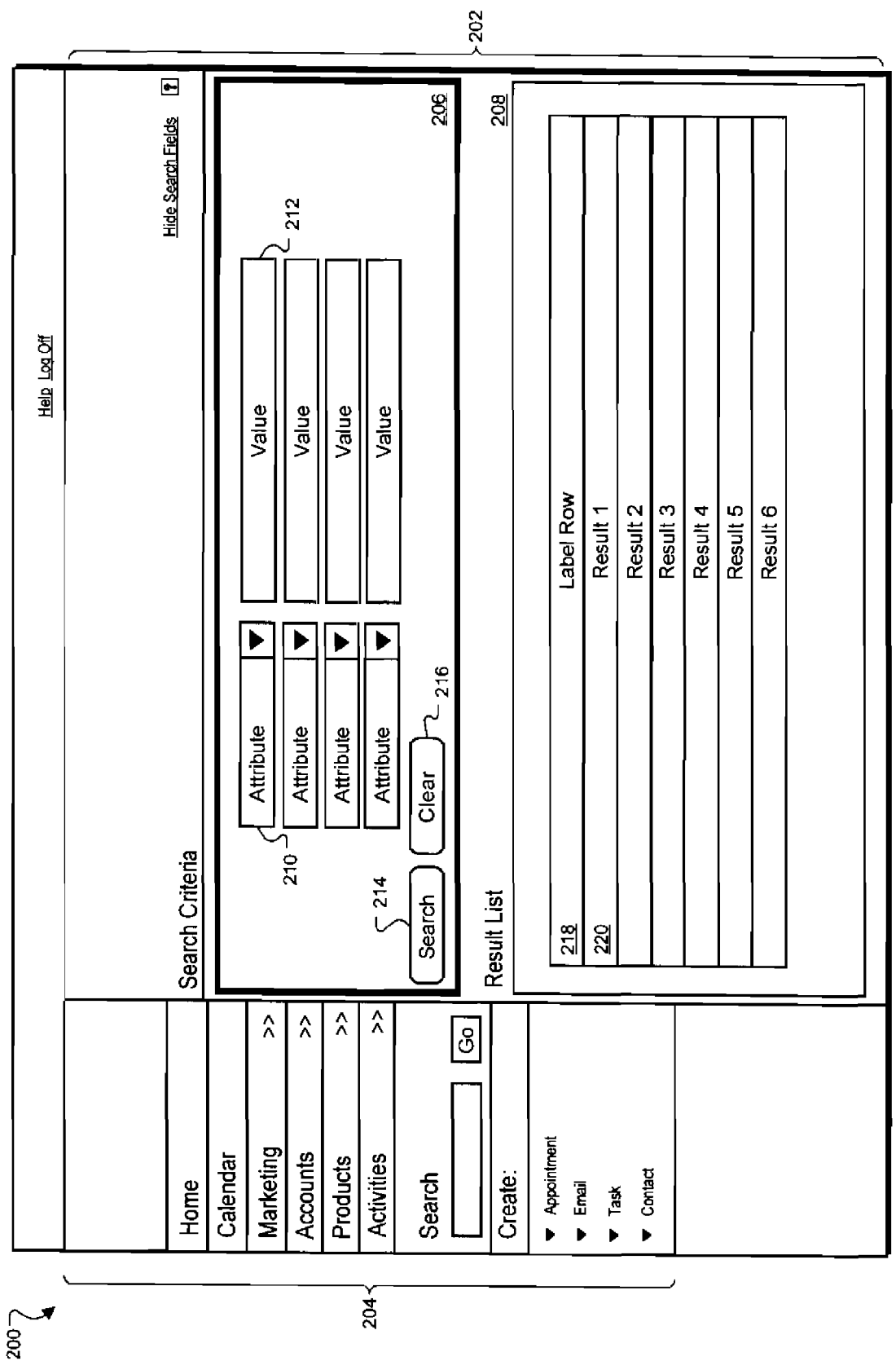
FIGS. 2-3 show exemplary user interfaces that can be used for receiving user input associated with a search in the computing system of FIG. 1.

FIG. 2 is a screen shot of an exemplary user interface 200 that can be used for receiving user input associated with a search in the computing system of FIG. 1. The user interface 200 includes a work area 202 for displaying screens that a user selects, a sidebar menu 204 for navigating the software architecture, a search area 206 for entering search criteria and a result display area 208 for presenting search results of a database search. FIG. 2 is exemplary, and any number of display areas may be presented, and these display areas may be located at any appropriate place within the user interface. In this example, the work area 202 includes the search area 206 and the result display area 208. Both the search area 206 and the result display area 208 may be minimized or maximized to provide an interface that is easily readable. This may provide advantages because a user of the system 200 may wish to view more search results than search criteria, or vice versa, and can modify the screen accordingly. The search area 206 includes one or more search statements for entering search information. In an implementation each search statement may be displayed on a single line of the search area 206. This may provide an intuitive interface, as a user may recognize and understand that a search statement, regardless of complexity, may be contained within a single line of the search area 206, which may help prevent confusion and may minimize search entry errors, which may lead to better search results. Additionally, the user may prefer to view search statements that occupy a single line, as it may be easier to interpret a search statement confined to a single line of the search area 206. Moreover, on-screen search area display space may be conserved, which may permit expansion of other display areas, such as permitting additional search results to be displayed, for example.

One or more search statements may be used to generate a search query. The example in FIG. 2 shows four search statements, each occupying a line in the search area 206, with each search statement having two fields for receiving input. Here, the first field 210 is an attribute field having a drop down control that permits a user to select among various attributes. The dropdown may contain labels of fields that can be used to formulate search restrictions for a particular business object, according to one implementation. Recall from above that attributes may be associated with business objects in the data repository 107. Thus, the attribute selected in a search statement may correspond to one type of data field. Attributes may correspond to various data fields (e.g., a text field, a numeric field, a date field, etc.). For example, when the user is searching for an account, the first attribute field 210 may be populated with "Name," since it may be logical to search for an account using the name of the account. Here, the system may be configured to search on text, rather than symbols or numbers, since names are typically text entries.

The second field 212 includes a corresponding value field for a particular attribute field. Users may input various data into the value field 212 to search for business object data associated with the selected attribute. In effect, the value field 212 may be used to enter a search restriction on the associated attribute. In the example of FIG. 2, a user may enter a value in the value field 212 that can be used in a search to restrict the attribute 210 when searching for objects having the selected attribute and value. The layout of the value field 212 may depend on the selected attribute. In the example shown in FIG. 2, the value field 212 is currently an empty text entry box. In some implementations, the value field may be a selectable file control, value help (value list or complex search help), or a dropdown control, to name a few examples.

The search area 206 also includes a control 214 for initiating a search query in the system. The search control 214 may initiate one or more search queries when selected. Alternatively, the user may select the enter key on a keyboard to initiate a search query in some implementations. Once the search is underway, results may appear in the result display area 208 as they are available. For example, results may appear in the result display area 208 a few at a time until the search is complete, or may appear together following completion of the search. The result display area 208 may display various results depending on user entered input. For example, when the user is searching for accounts, several fields may appear pertaining to search-identified accounts. The fields may be presented in a label row 218, and may include labels such as ID number, country, and company name, etc., to identify the particular field. In FIG. 2, the results may be displayed in one or more result rows 220, located under the label row 218 in this example, according to the label. The results may be selectable and may include information, links, objects, or help content. In addition, the user may select several results at one time for copying or dragging into another application, for example. The result display area 208 may also return zero results when nothing is found after execution of a search query. In some implementations, the result display area 208 may be personalized, or user configurable, according to the labels, number of results viewable, or number of results received at one time, to name a few examples.

The search area 206 also includes a control 216 for clearing search entries in the system. The clear control 216 may clear all search fields, as well as the search result list, but may not typically reset the search statement itself. In another implementation, the clear control 216 may clear only selected fields. In one implementation, the number of search statements remains the same following a selection of the clear control 216, and the selected attributes.

Figure 3:
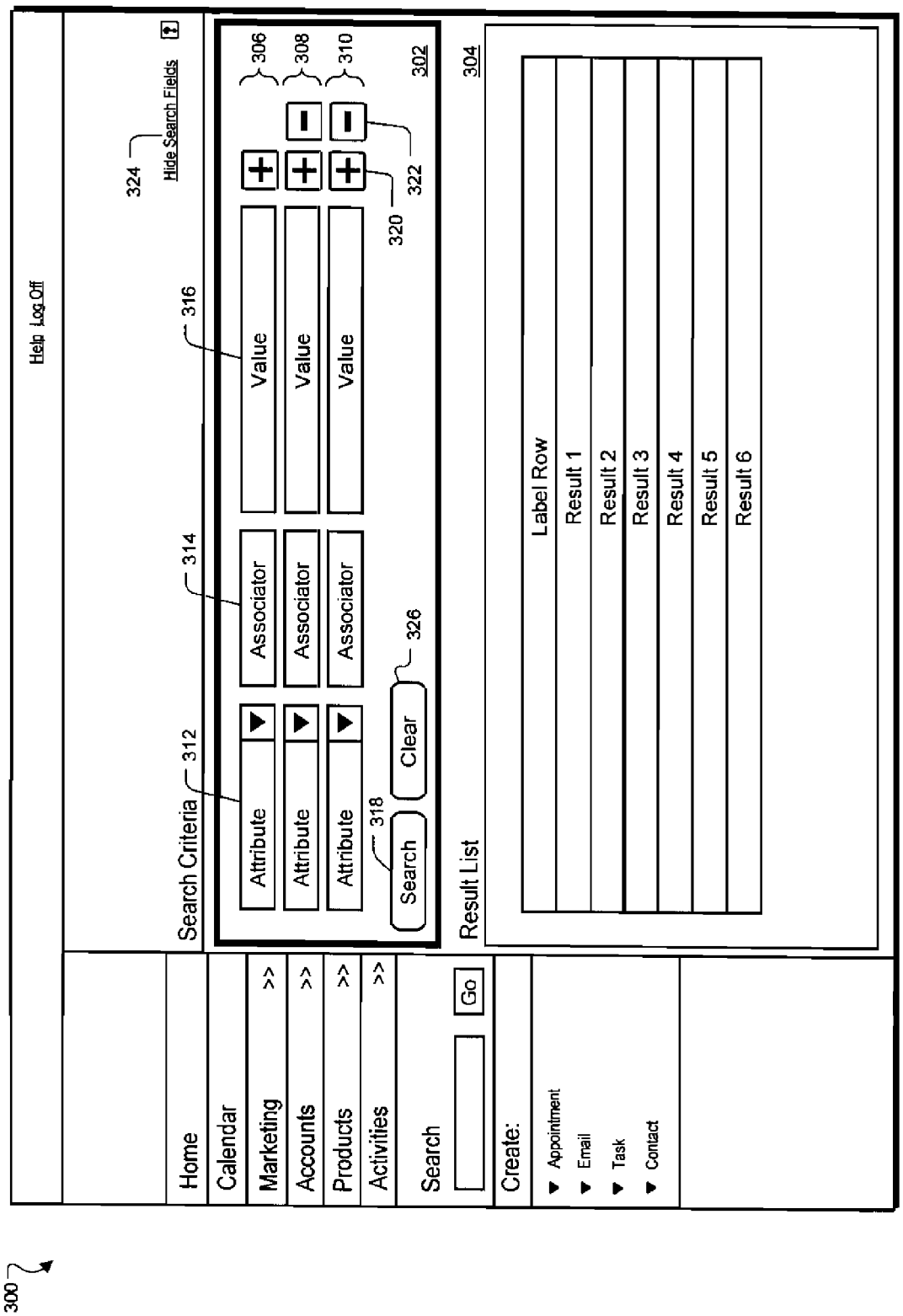

FIG. 3 is a screen shot depicting another example of a user interface 300 that can be used for receiving user input to perform a search query, for example, in the computing system of FIG. 1. Similar to FIG. 2 above, the user interface 300 includes a search area 302 for entering search criteria and a result display area 304 for displaying search results. In this example, the search area 302 includes three search statements 306, 308, and 310, each occupying a single line of the search area 302. In the example of FIG. 3, each search statement includes an attribute field 312, an associator field 314, and a value field 316. In general, the attribute field 312 may be linked to the value field 316 by the associator field 314 to create a specific relation between the two. Thus, the created link may provide the system 100 with a search statement that may limit returned search results in a desirable way. The fields shown in FIG. 3 are exemplary and there may be additional or fewer fields in a single search statement. After the search statements are set, whether entered by a user or configured by the system or some combination thereof, the user may select a search button 318. The system may then analyze the search statements and generate appropriate logical operators and grouping elements, and may formulate a search query for searching a database. Search results may be obtained and presented in the result display area 304, where the user may view, store, send, or otherwise operate on the result content.

As stated above, the attribute field 312 may be a selectable control, such as a dropdown box where a user can select attributes. Attributes may include text, such as names, countries, or businesses; numbers, such as identification numbers, account numbers, postal codes, or phone numbers; or may include user configurable entities. Examples of additional attributes may include skill set, employee name or number, salary, revenue, and various other business entities that may be found in an enterprise resource computing system. The associator field 314 may be a dropdown box containing suitable operators with respect to a previously selected attribute. For example, the associator field 314 may include operators such as "IS," "IS NOT," "IS EMPTY," "STARTS WITH," "EQUALS," and "CONTAINS," for attributes that correspond to a text field. Examples of additional associators may include "IS LESS THAN," "IS GREATER THAN," "IS BETWEEN," "DOES NOT EQUAL," "IS EARLIER THAN," and "IS LATER THAN." In some implementations, a selected portion of an entire set of associators may be available for a particular selectable attribute. Value field 316 may be used to enter a search restriction on the associated attribute 312 within the search statement 306.

As shown in FIG. 3, the search area 302 also includes one or more "plus" icon 320 and "minus" icon 322 for adding and removing search statements. In an implementation, when the plus icon 320 is selected behind a search statement, a duplicate of that statement is displayed directly below that statement. In some implementations, the current entries for the attribute field 312 and the associator field 314 are also duplicated. In an implementation, entered search restrictions are not duplicated. Thus, a user desiring a database search according to two or more restrictions on a particular attribute may select the plus icon 320, which may cause the system to provide a new search statement having a common attribute, and may then enter a further search restriction on that common attribute in the value field of the new search statement. The user may select a new associator 314 in the new search statement, if desired. The system may automatically generate a logical OR operator to associate the search statements having common attributes, and may form an appropriate search query. The logical OR connection may be provided without the user entering any logical operators or grouping elements. As such, the search interface may be user-friendly and intuitive, and may not require user familiarity with details of Boolean logic.

As an example, a search may be performed to find all system accounts having the last name "Smith" or "Miller." Here, a user may select "Name" for a first attribute field, "IS" for the associator field, and then input "Smith" in the first value field. Next, the plus icon 320 may be selected to create a new search statement having a common attribute ("Name") by duplicating the associated search statement. The user may then input "Miller" in the value field of the newly created search statement. In this example, the search query may be formulated using the two search statements having a common attribute. The architecture 100 may automatically create an implicit logical OR operator between the two search statements upon detecting that they have a common attribute. For example, the operator may be generated when the plus icon is selected or later, such as following a selection of the "Search" control 318. The search query may be formed and a data store may be searched using the search query. Upon completing the search, the search results may include all accounts with the last name "Smith" or the last name "Miller." This may be useful, for example, if a particular user is interested in identifying all customers having last name Smith or Miller, and may facilitate retrieval of such information with a single search, rather than two separate searches.

Alternatively, when the minus icon 322 is selected, the corresponding search statement line may be removed. This may be useful, for example, if a user does not wish the requested search to include the search criteria present in a given search statement. Note that in the example implementation shown, the first search statement includes a plus icon, but not a minus icon, indicating that it may not be removed. In some implementations, the first search statement may be removed. In some implementations, the entire search area may be hidden or revealed by the selection of a "hide search fields" control 324. In general, the "plus" 320 and the "minus" 322 controls are optional, and some search statements may include zero, one, or two such controls.

In some implementations, the user may wish to add a search statement in the search area 302, but may prefer to perform the search on two or more different attributes. The architecture 100 may allow for added search statements having different attributes, or may permit a user to select another attribute than are present in previous or subsequent search statement lines. In this example, the architecture 100 (e.g., search assessment module 112) may determine that the attributes are not common, and may automatically generate and include a logical AND operator between search statements that include distinct attributes. As an example, a search may be performed to find all system accounts having the last name "Smith," and the postal code "89893." Here, a user may enter "Smith" and "89893" in separate value fields of separate search statements. The architecture 100 (e.g., operator generation module 114) may automatically create a logical AND operator to operate on the two search statements. The results may return all accounts with the last name "Smith" and the postal code "89893." This may be beneficial, for example, if a particular user is interested in all customers having last name Smith in one general location (i.e., within the area defined by postal code 89893), and may facilitate retrieval of such information with a single search, rather than two. The operator generation module 114 may also generate logical operators and grouping elements for search statements or portions thereof that are included by default in the search area 302. For example, it may be determined during system configuration that one or more particular search statements are likely to be frequently used, and those one or more search statements may be configured to initially appear in search area 302.

In general, the searches performed using architecture 100 may include multiple types of logical operators, such as both an AND operator and an OR operator, for example. The system may automatically formulate the search query to include the operators, without requiring a user to input any logical operators. In this manner, the logical operators may be implicitly added, as perceived from the user's point of view because the user may not be required to enter the operators, in one implementation.

Upon completion of one or more searches, a user may select a clear control 326 to clear the search area. In some implementations the clear control 326 may clear all search fields, as well as the search result list. The selected attributes and the number of added search statements may remain unchanged after the clear control 326 is selected, according to an implementation.

Figure 4:
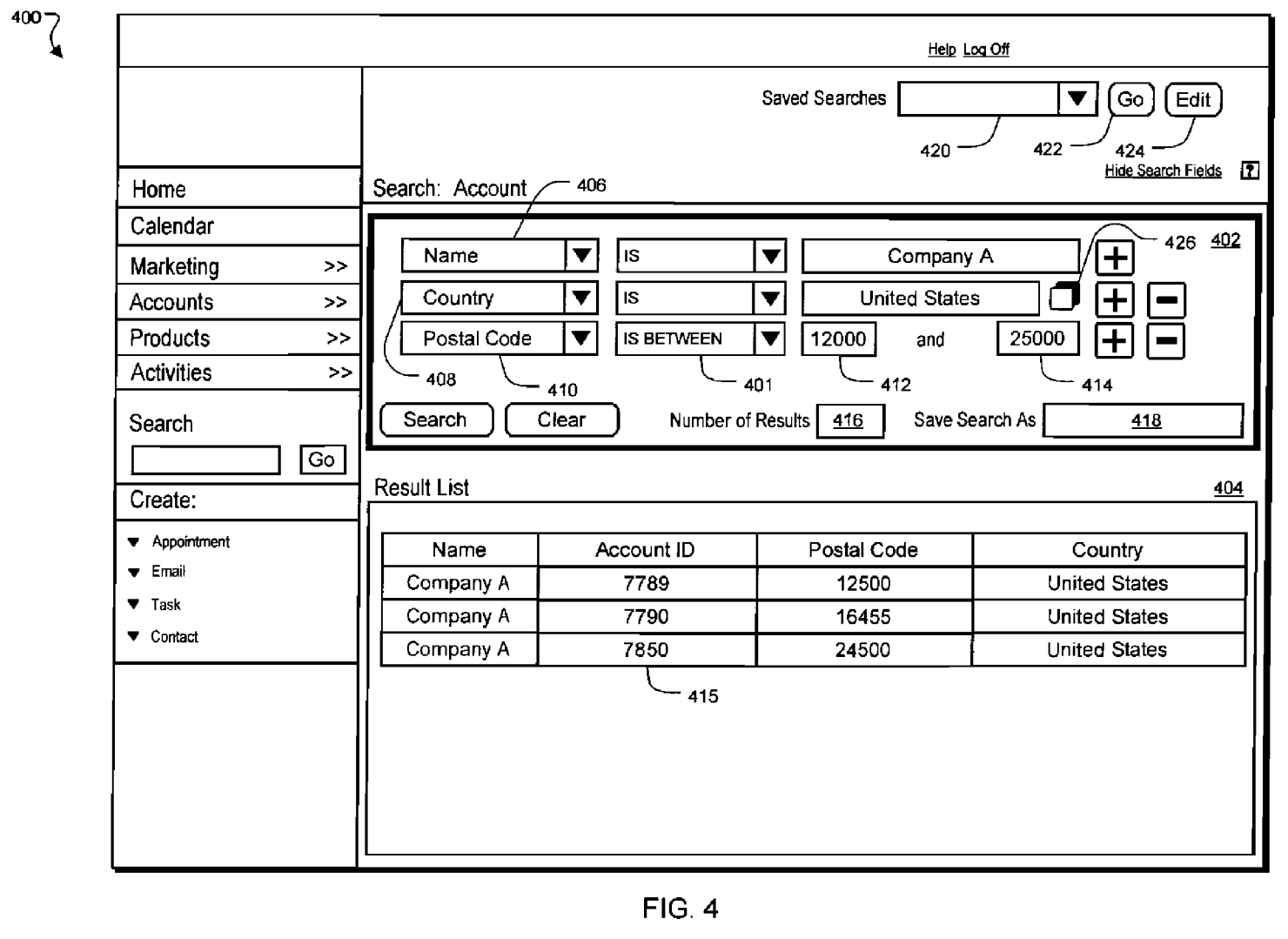

FIG. 4 is a screen shot of an exemplary user interface 400 that can be used for searching over a range of values in a single search statement. The example shown in FIG. 4 includes a search statement that may permit searching over a range of values. In particular, an "IS BETWEEN" associator 401 permits searching over a range of values with a single statement. For example, when the "IS BETWEEN" associator 401 is selected, a lower field and an upper field may be displayed in the same search statement line to allow a lower limit and an upper limit on a range of values to be entered. Displaying the two value fields within a single search statement on a single line, rather than on two or more lines, may permit a more intuitive search statement and may require fewer user operations. In addition, a reduced amount of screen space may be needed for search statements, which may free up more area for displaying search results.

The interface 400 includes a search area 402, a result display area 404, as well as various options for enhancing search result displays. Here, a user is searching for an account using three search statements, where each search statement includes a different attribute: "Name" 406, "Country" 408, and "Postal Code" 410. The user has entered criteria indicating that the search may be for an account having the name "Company A," the country "United States," and a postal code between "12000" and "25000." The architecture 100 may assess the received input using the search assessment module 112 to group the search statements accordingly, and include operators (determined in the assessment) using the operator generation module 114, as appropriate. For example, the first search statement includes the attribute "Name," the associator "IS," and the value "Company A." This search statement, if entered alone, may return all accounts with the name "Company A." However, the user here has entered further criteria to narrow the received search results. For example, the second search statement includes the attribute "Country," the associator "IS," and the value "United States." When combined with the first search statement, the search query now contains two search statements, and the architecture 100 may place an operator between the two search statements using the operator generation module 114. For example, because the two search statements operate on different attributes, the operator generation module 114 may implicitly place a logical AND operator between the two statements, such that search results having the name "Company A," and the country "United States," may be located. In addition, a third search statement has been entered that includes the attribute "Postal Code," the associator "IS BETWEEN," and two values. The two values shown indicate a lower range limit 412 (here, 12000) and an upper range limit 414 (here, 25000) for the "Postal Code" attribute 410. Because the three search statements in this example each include different attributes, the operator generation module 114 may implicitly connect the three statements using logical AND operators. Thus, the three lines may be interpreted in the architecture 100 and formulated by the query formulation module 116 into the form:

statement 1: {[<Name> IS <Company A>] AND
statement 2: [<Country> IS <United States>] AND
statement 3. [<Postal Code> IS BETWEEN [<12000> AND <25000>]]}

The search module 118 may perform the search and the presentation module 120 may present the results. The search results may include all accounts having the name "Company A," the country "United States," and a postal code between "12000" and "25000." In some implementations, the query formulation module 116 may use different syntax, rules or methods to formulate the search. As shown, the result area 404 lists three results, each having separate account identifier data 415 for distinguishing between the accounts. The results may correspond to accounts associated with three of Company A's branch locations, for example.

The interface 400 also includes various search result features. For example, a "number of results" field 416 is shown and allows for entering a number of results a user wishes to view in the result display area 404. The field 416 may be configurable by the user and may be set to capture a maximum number of results, or a number of viewable results in the current interface, for example.

Another search result feature may allow a user to save, edit, and recall search results using interface 400. The search results may be saved and recalled from one or more electronic storage devices in the enterprise resource computing system. A "Save Search As" control 418 and a "Saved Searches" control 420 may be included in the interface 400 to facilitate saving, editing, and recalling search results. The "Save Search As" control 418 includes a text box where the user may enter a file name for the search most recently performed. In some implementations, a save control (not shown) may appear upon entering the file name. In other implementations, entering the file name and a hot key, such as an enter key, may automatically save the search results. In general, if a search field of the saved search is left empty, the statement may not be included in the saved search results. For example, if an attribute has no corresponding value entered when the user attempts to save the search results, the search line content may not be saved. In other implementations, all statements may be saved.

The "Saved Searches" control 420 may include a dropdown box to select a search for retrieval. A user may select a previously saved search from the dropdown box and select a "GO" control 422 to open the search and display the result content from the prior search. As another option, the user may select an "Edit" control 424 to open the search area 402 with the same attributes and values entered as when the search was saved. Here, the user may modify attributes, associators, and values, as well as add or delete search statements before running the search query.

The user interface 400 also includes a value help icon 426. The value help icon 426 here is shown near the value field corresponding to the "Country" attribute 408. The icon 426 may be hovered-on or selected to provide a user with further information about the field. For example, the user may hover over the icon 426, as by positioning a pointing indicator over the icon 426 using a mouse, for example, to view a list of common countries selectable for the search. Value help icons may display on any, all, or none of the selectable fields in the application, and will be discussed in greater detail below. In some implementations, value help icons may be enabled and disabled as configured by the user.

FIG. 5 is a screen shot of an exemplary user interface 500 that can be used for searching over multiple ranges of values. In particular, the interface 500 may assess search statements and automatically combine one or more of the statements having common or similar attributes with a logical OR operator without requiring a user to provide the logical operator or an indication thereof, or the associated grouping operators or elements that operate on the search criteria and the logical operators. In addition, statements having different attributes may be combined with other statements using a logical AND operator in a similar fashion. Similar to FIG. 4, the user interface 500 also includes the search area 402 and the result display area 404. As shown in FIG. 5, four search statements are currently present in the search area 402; the first three statements have distinct attributes, while the fourth statement includes a common attribute ("Postal Code") to that of the third statement. Thus, for the four search statements currently shown in FIG. 5, two of the statements have a common attribute and the other two statements include distinct attributes from each other and from the statements that share a common attribute. As such, when the system analyzes the search statement, three groups may be formed, with one group including two statements and two groups including single statements.

In this example, a user has selected a plus icon on the "Postal Code" search statement (410), shown in FIG. 4. Upon selection of the plus icon, a second search statement 502 is generated and in this example, includes the same attribute type as the previous statement. When the search statement is duplicated, the architecture 100 may also implicitly generate logical operators to link the statements together. As described above with respect to FIG. 4, the user may be searching for a particular account having specific attributes. In this example, the user has entered a first range and duplicated the last search statement in FIG. 4 to produce a new search statement 502 in FIG. 5 having range value boxes where the user may input a second range of values. As shown in FIG. 5, the user has currently entered a new range in search statement 502. The user may be searching for an account with a postal code between a first lower limit (here, 12000) and a first upper limit (here, 25000), as well as between a second lower limit (here, 45000) and a second upper limit (here, 65000). That is, the user may be searching for an account having a postal code either between 12000 and 25000 or between 45000 and 65000. Since the two search statements are defined to operate on the same attribute, the operator generation module 114 shown in FIG. 1 may implicitly connect the two search statements using a logical OR operator. Similarly, the operator generation module 114 may implicitly connect the other two search statements (i.e., the statements having attributes "Name," and "Country") with the group of logically OR-combined statements using a logical AND operator since the other statements in the search area operate on different attributes. Thus, the four lines may be interpreted in the architecture 100 and formulated by the query formulation module 116 into the example form:

```
statement 1: {[<Name> IS <Company A> ] AND
statement 2: [<Country> IS <United States>] AND
statement 3: {[<Postal Code> IS
BETWEEN [<12000> AND <25000>]] OR
statement 4: [<Postal Code> IS BETWEEN [<45000> AND <65000>]]}}
```

The search module 118 may perform the search and the presentation module 120 may present the results. The search results may include all accounts having the name "Company A," the country "United States," and a postal code between "12000" and "25000" or a postal code between "45000" and "65000." As shown in the result display area 404, the search results currently include accounts 504, 506, and 508 that have the name "Company A," the Country "United States," and the postal code between "12000" and "25000." These results 504, 506, and 508 were identified as a result of the incorporation of the search statement with postal code range 12000 to 25000 into the search query. The result display area 404 also currently includes results 510, 512, 514, 516, and 518 that were identified as a result of the incorporation of the search statement with postal code range 45000 to 65000 into the search query.

The search statements may generally be grouped according to the associated attribute, and the logical operators may be added according to how the search statements are grouped. For example, the selected postal code attribute in the example described above permits the statements that include the postal code attribute to be grouped together using a logical OR operator to produce results including both a first and second range of postal code values. The entry of the search criteria may require less time and effort, including fewer input operations, by the user as the grouping may be automatically performed by the architecture 100. In some implementations, the manner in which elements are grouped and the placement of the logical operators may not be shown to the user, so as to minimize the opportunity for confusion with the search entry process. In an implementation, the user may not submit input specifying grouping and logical operators. Instead, the search assessment module 112 may analyze the entered statements and automatically group statements that have common attributes together. The operator generation module 114 may then generate the appropriate operators and the search query may be formulated. For example, for groups that include more than one search statement having a common attribute, those more than one search statements may be associated with one another using logical OR operators. As such, a group consisting of logically OR associated statements may be formed. Then, logical AND operators may be used to associate each of the groups, and the single-statement groups. In addition to grouping similar attributes, the architecture 100 may group combined search attributes in a single search statement.

FIG. 6 is a screen shot of an exemplary user interface 600 that can be used for searching with combined search attributes. The user interface 600 is similar to the interfaces shown in FIGS. 2-5 above, and includes a search area 602 and a result display area 604. The search area 602 currently includes four search statements 606, 608, 610, 612 that allow a user to enter search criteria. In some implementations, the search statements shown in interface 600 may be considered the four most common search fields used in the application, and may be provided by the system by default. In other implementations, the search statements shown by default may be user configurable. The search statements shown in FIG. 6 include a "Name" attribute in the first statement 606, an "ID Number" attribute in the second statement 608, a "Country" attribute in the third statement 610, and a "Qualification" attribute in the fourth statement 612. The search area 602 shown in this example does not include parameters in the "Name" value field, the "ID Number" value field, or the "Country" value field. As such, in this example, a restriction may not be placed on the corresponding attributes when a search is performed. For example, results may be returned to the user having varying names, ID numbers, and countries.

The user interface 600 of FIG. 6 shows one implementation of searching with combined search attributes, and any number of methods may be appropriate for combining the attributes. For example, a combined search may combine two attributes and two values in a single search statement. In general, constructing a search statement may include selecting a first attribute, selecting an associator, and entering one or more values, as shown in the above examples. In some implementations, a second optional, dependent attribute and value may be entered with the first attribute and value within the same search statement. The fourth search statement 612 shows an example of a combined search attribute that includes a first attribute and a dependent attribute. The dependent attribute may depend on the first attribute for context, or to supply meaning. In some implementations, two or more dependent attributes may be included in one search line. For example, a search statement may include a first attribute and one, two, three, four, five, or more dependent attributes, which may each also include one or more associated attribute values. The dependent attribute and value may pertain to the information in the first attribute.

For example, a user may wish to search for an individual having the ability to program in the programming language C++ with high proficiency. The user may enter the search criteria as shown in search statement 612 in FIG. 6. Here, the user has entered a first attribute "Qualification," an associator "IS," and a value "C++ Programming." Next, the user may enter a dependent second attribute "Proficiency" 622, as well as an associated second field value "High" 624. The "Proficiency" attribute 622 is a shown here as a dependent attribute to the "Qualification" attribute. The "with" operator in "with Proficiency," as the dependent attribute is shown, emphasizes this dependency. In other words, the "with Proficiency" attribute may generally display in conjunction with a leading attribute, such as the "Qualification" attribute. In some implementations, the "with" operator may be included to make the search statement more readable from the user's point of view. In formulating combined search statements, the system may include a logical AND operator between the two search statement attribute/value pairs. In this example, the user desires to identify the individual(s) meeting the criteria Qualification/C++ Programming AND Proficiency/High. The system may implicitly include the AND operator, and this may be done in transparent fashion from the user's perspective, which may advantageously relieve the user of the burden of understanding Boolean logic. The architecture 100 may further implicitly includes an "IS" associator between a dependent attribute and its associated value field (here, between "Proficiency" and "High"). Thus, the search statement may be interpreted in the architecture 100 and formulated by the query formulation module 116 into the form:

<Qualification> IS <C++ Programming> AND <Proficiency> IS <High>

Combined search statements may provide the advantage of being more intuitive and easier to use for a user. Combined search statements that include dependent attributes may be advantageous because the dependency may be clearly shown on a single search line, rather than on two search lines, making it easier to recognize the dependency. This may consume less display space, which may leave more display space available for search results. In some implementations, the value "C++ Programming" may be selected from a value help menu available through an icon 613. The value help menu may include several selectable values dependent on the attribute selected. In this example, the value help menu may include various other skills qualifications a user may possess. This may provide a convenient way for a user to select a desired value from among a list or table of values or options.

After the search statement is formulated, the user may select a search control 614 to run the search query. Results from the search query may be displayed in the search result area 604. As shown, the result area 604 currently includes individuals (here, Persons A-G) qualified to program in C++ with high proficiency. As described above, restrictions may not have been placed on attributes with empty value fields. Thus, the search results display a varying list of Names 616, ID Numbers 618, and Countries 620 because the user left the value fields empty for each of these attributes.

FIG. 7 is a screen shot of an exemplary user interface 900 that can be used for searching a data repository in a computing system. The interface 900 includes a search area 902 and a result display area 912. The search area 902 includes three search statements, and each search statement includes a different attribute: "Campaign ID" 904, "Campaign Desc[ription]" 906, and "Start Date" 908. The user has entered "BB*" in the input field 910 of the second search statement, where "*" may be a wildcard character that indicates the user is interested in all campaign descriptions that begin with the letters "BB."

The search module 118 may perform the search and the presentation module 120 may present the results. The search results may include all campaigns having descriptions that begin with "BB." As shown, the result area 912 lists two results, each having separate campaign ID identifiers ("BB-329" and "BB-518") for distinguishing between the accounts. In this example, the campaign ID identifiers include selectable links, which may be selected by a user. For example, a user may select the "BB-329" link 914, and the architecture may automatically present a table of information associated with the "BB-329" campaign ID. The links are indicated by underlined text in FIG. 7, but alternative methods of presenting a link in the user interface may be used. For example, a different text color may be used to indicate a link, a combination of color and text underlining may be used, or a selection control, such as a button, may alternatively be used. In response to a selection of the "BB-329" link 914, the user interface may present the display pictured in FIG. 8 and described below. In some implementations, when the user selects the "BB-329" link 914, the architecture may present another screen, such as an overview screen, which may provide information on the selected identifier (a campaign in this example). The overview screen may include a table of information, and may include an "Edit List" button that may be selected. When selected, the architecture may permit the user to edit the table in a fashion similar to the implementations described below with reference to FIGS. 8-11.

FIG. 8 is a screen shot of an exemplary user interface 920 that can be used for presenting an editable table 924 of information. The editable table 924 contains rows or records of data, which data may have been stored in a data repository. In an implementation, the data shown in table 924 may be maintained by the server device 101 in the repository 107 (FIG. 1). The server device 101 may transmit the data to the client device 104 in a communication over network 106. Prior to dispatching the communication, the server 101 may retrieve the contents from the data repository 107 and may configure the contents to be organized in a table, such as table 924. For example, the server 101 may organize the content into rows for presentation in the table 924. The table 924 shown in FIG. 8 contains several rows of content, each associated with a particular campaign, in this example. A title 925 describes that the table 924 contents relate to campaign "BB-329," an expected result given that the user selected the link having the same name in this example, as described above with reference to FIG. 7. The table includes column headers "Product ID," "Product Desc," "Unit," "Product Group," and "Category." In an implementation, a server roundtrip may occur where the client device 104 sends a request for information to the server device 101, the server device 101 assembles the information as described above and sends a communication to the client device 104 to render the user interface 920, including the editable table 924. In some implementations, the presentation module 120 (FIG. 1) is used to prepare the data, while in other implementations another presentation module (not shown in FIG. 1) may be used.

The table 924 includes an empty row 926 near the bottom of the table 924. In an implementation, the empty row 926 may indicate a possibility of adding at least one new row to the table. For example, the empty row 926 may automatically be kept empty during work on the table. As mentioned previously, the table 924 may be editable. While a single empty row 926 is shown in FIG. 8, the table 924 may include any number of empty rows 926 (e.g., one, two, three, four, five, etc.) that may receive user input for new record or new object creation. A user working with the table 924 may wish to add data to the table 924, for example. The user may desire to quickly add content to the table 924, including one or more rows of content to the table, in a natural and efficient fashion, without having to perform extraneous actions within the user interface.

Consider, for example, that the user is a marketing coordinator for a computer hardware supplier, and is making preparations for a computer trade show exhibition. The user may be using the interface 920 shown in FIG. 8 to assemble a working schedule of products to be displayed at the exhibition. The table 924 shows that, at present, seven units may be scheduled for display at the exhibition because seven populated rows of content are shown: three handheld computers (Product IDs HT-1010, HT-1020 and HT-1030), three notebook computers (HT-1040, HT-1050 and HT-1060), and one desktop computer (HT-1060). Suppose in this example that the user wishes to add a new entry to the campaign by adding a new row of content to the table 924. For example, the marketing coordinator may wish to add content describing a notepad computer to the table 924.

As described above, the empty row 926 may indicate a possibility of adding a new row to the table, and the empty row 926 may be displayed in the table 924 within the user interface 920 from the time that the table 924 is initially displayed, despite not including any content from the data repository 107, according to an implementation. The user may perform an operation in the user interface that indicates the empty row 926, such as selecting a field of the empty row 926, for example. Other operations that the user might perform in the user interface to indicate the empty row 926 may include "tabbing" into the empty row 926, or keying data into a field of the empty row 926. This user input may be configured to trigger a new row to be added to the table, according to an implementation. For example, the user may use a pointing device to select the "Product ID" field 928 of the empty row 926, the "Product Desc" field 930, or the "Product Group" field 932 of the empty row 926, to list just a few examples. Suppose, for example, that the user selects the "Product ID" field 928 of the empty row 926 by clicking on the field. Another screen can then be presented, for example, as will now be described.

Figure 9:
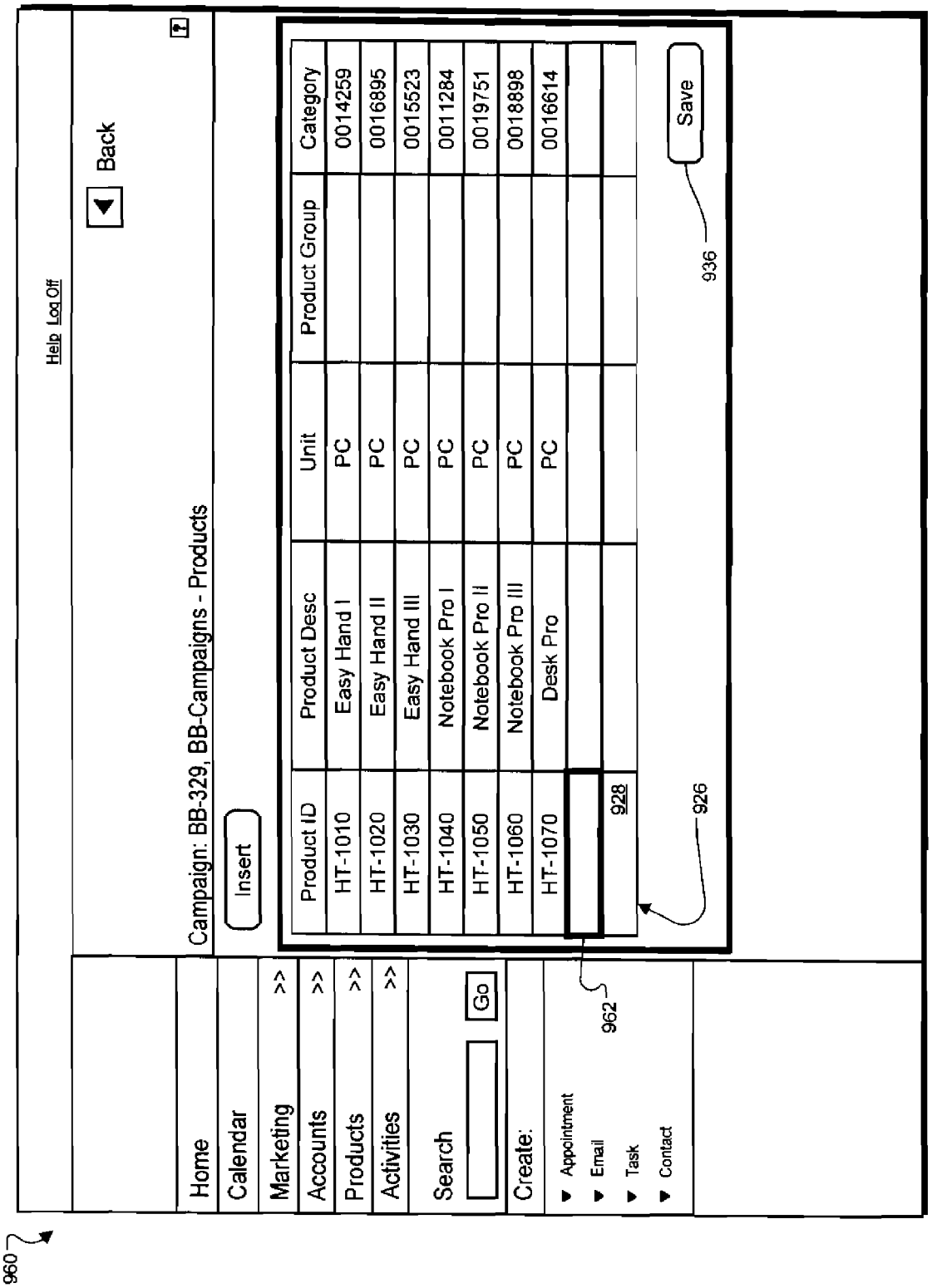
FIGS. 9-10 show exemplary user interfaces that can be used for automatically adding a new row to a table.

FIG. 9 is a screen shot of an exemplary user interface 960 that can be used for automatically adding a new row 962 to a table. The user interface 960 may be displayed on the client device 104 after the user performs an operation that indicates the empty row, such as selecting field 928 of the empty row 926 as described above. As shown in FIG. 9, the empty row 926 from FIG. 8 is still present in the table, and is still presented at the bottom of the table. A new row 962 has been added to the table at the previous position of the empty row 926 in FIG. 8. In an implementation, the new row 962 may be added to the table in response to the user input indicating the empty row 926 (clicking on field 928 in this example). As shown in FIG. 9, the first field of the new row 962 is now in focus (corresponding, in position, to the field 928 that was selected in the empty row 926), as indicated in this example by the bold outline surrounding the field, which may indicate that the user may enter data into the first field of the new row 962.

Had the user instead selected field 930 (the second field) in the empty row 926 in the interface 920 of FIG. 8, the second field of the new row 962 (corresponding, in position, to the selected field 930) may instead be in focus in the FIG. 9 interface 960, according to an implementation. If the user had entered a data keystroke into a field of the empty row 926 (e.g., entered "H" into field 928 in the interface 920 of FIG. 8), the new row 962 in FIG. 9 may include the entered data in the corresponding field of the new row 926 (the first field of the new row 962 in this example), according to an implementation. In an implementation, the user may enter such a data keystroke in a field of the empty row 926 when the field is in focus on initial presentation of the table, for example.

In an implementation, instructions executing locally on the client device 104 may cause the new row 962 to be added to the table. For example, the script code 164 (FIG. 1) may be executing on the client device 104 and may include instructions that when executed create and display the new row 962 in the user interface 960 in response to receiving the user input that indicates the empty row 926. The new row 962 may thus be added to the table without first communicating with the server device 101 regarding the addition of the new row 962 to the table. The new row 962 may be configured to accept contents, such as data entered by a user, to be added to the data repository 107. In an implementation, the client 104 may send a communication to the server device 101 requesting that the content be added to the data repository 107. This communication may occur at some later time, according to an implementation. For example, the communication may occur in response to the user selecting a control in the user interface, such as a "Save" button 936. Alternatively, if the user navigates away from the displayed interface 960 to another page, a communication may be sent to the server 101 requesting that content entered in the table be saved to the repository 107.

Figure 10:
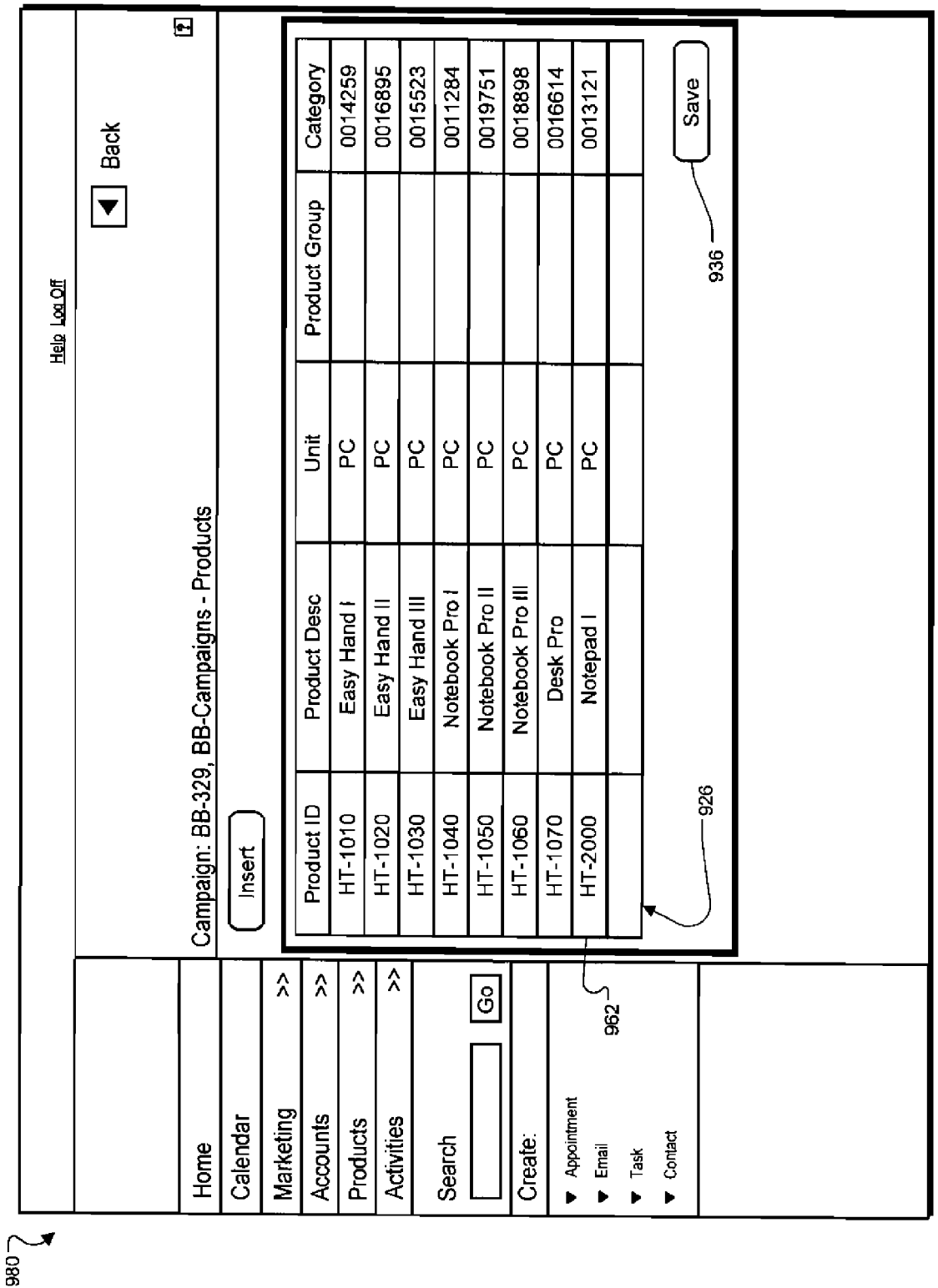

FIG. 10 is a screen shot of an exemplary user interface 980 that can be used for automatically adding a new row to a table. As shown in FIG. 10, the user has entered content into the new row 962, including entering a product ID ("HT-2000"), a product description ("Notepad I"), a unit ("PC"), and a category ("0013121"). In a subsequent communication with the server 101, the client 104 may request that the new content in row 962 be stored in the data repository 107. Such a communication may be initiated, for example, by a selection of the "Save" button 936, for example. The server 101 may thereafter store the content to the repository 107, and may perform validation checks on the content, if appropriate. The empty row 926 remains empty and capable of receiving an input to indicate the addition of another new row, which new row may then accept additional new content that may be stored to the repository 107. For example, if the user were to perform an operation in the user interface 980 to indicate the empty row 926 in FIG. 10, another new row may be created in the table, in similar fashion to the way row 962 was created above as described with reference to FIGS. 8-9. Thus, a user working with an editable table may be able to quickly and efficiently add records, data objects, etc., to the table without performing extra user interface actions. In particular, the user need not select a control specifying that a new object be created, such as a "Create Object," "Insert," or "Add Object" control, and may thereby avoid any associated slow-down or interruption in performance. In an implementation, at least one empty row may always be displayed in the editable table for receiving user-entered content in the table, and a new row may be created and displayed in the editable table when the user performs an action in the user interface that indicates the empty row.

Efficient editable table modification may have several benefits. For example, data entry may be performed faster because extraneous user interface actions may be avoided. A customer service representative who responds to customer inquiries over the phone, for example, may want to quickly enter information gathered from the customer during a call into an editable table containing account information for the customer. Some customers may speak rapidly and may convey a large amount of information in a short amount of time. Here, the capability to quickly add the new information to the editable table with the automatic creation of new rows, as described above, may permit more accurate capture of data, which may permit the representative to provide better service to the customer. Similarly, data entry errors may be reduced as a user may focus on the data entry without being concerned about performing extra user interface actions. Performance may be increased because one or more new rows may be automatically added to the table without a server roundtrip.

Figure 11:
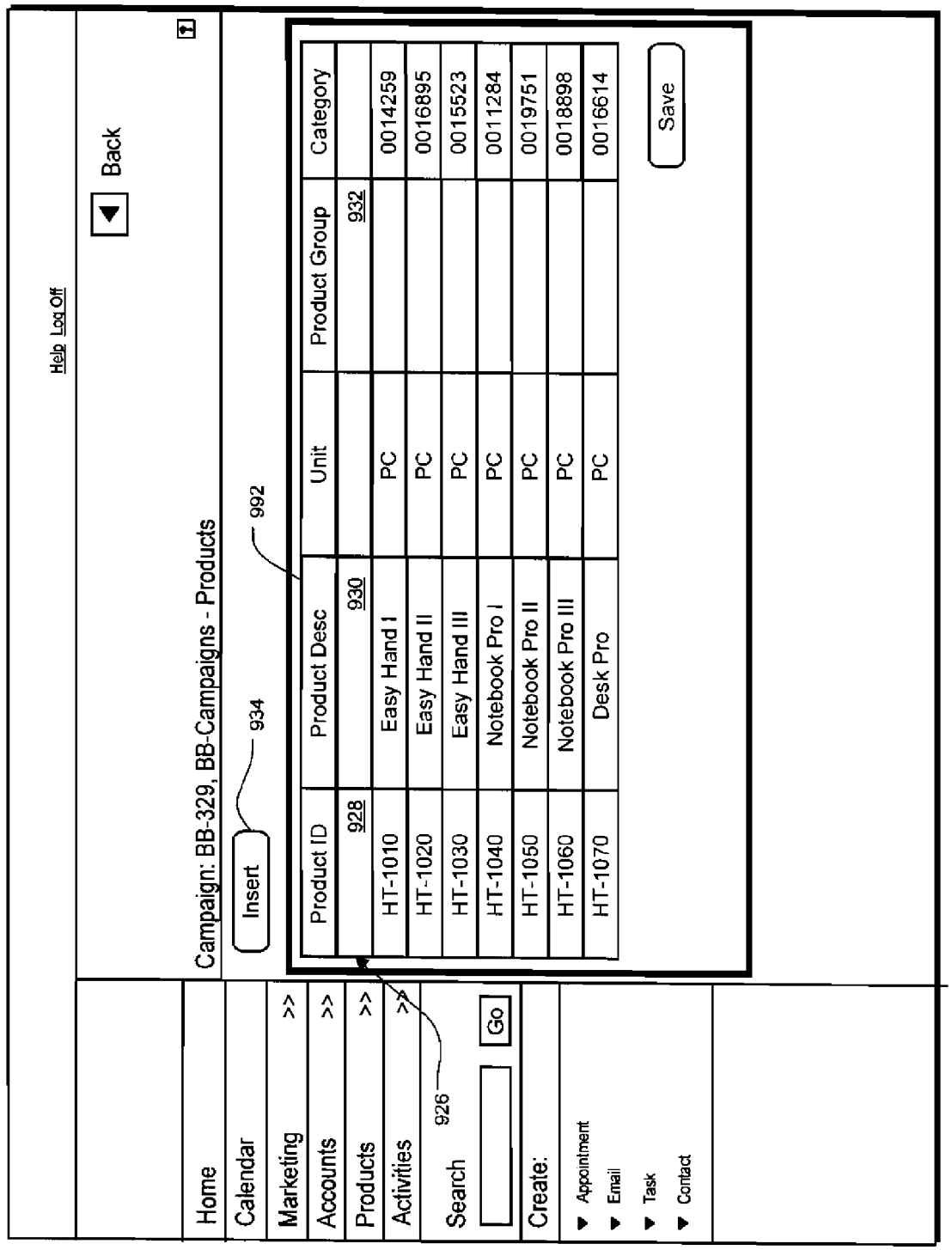
FIG. 11 shows an exemplary user interface that can be used for presenting an editable table of information.

FIG. 11 is another screen shot of an exemplary user interface 990 that can be used for presenting an editable table 992 of information. FIG. 11 is similar to FIG. 8, except that the empty row 926 is displayed near the top of the table, rather than near the bottom as was shown in FIG. 8. The empty row 926 in FIG. 11 may function like the row 926 of FIG. 8, according to an implementation. The empty row 926 may be displayed at the top, bottom, or somewhere between the top and the bottom of the table 992, according to an implementation. For example, if the focus of the user interface is on a field in one of the middle rows of the table, and if the user selects an "Insert" control 934, a new empty row may be added above or below the focused row at the time the control 934 was selected, according to an implementation. In general, added rows in the table may be capable of accepting content that may be stored to the data repository 107, according to some implementations. In some implementations, the empty row 926 may be capable of accepting contents for storage to the data repository. The applicability of empty row inclusion for record or object creation in a table without requiring a server roundtrip is not limited to tables associated with search results. Any editable table or list that may be presented in a user interface may benefit by the systems and techniques disclosed herein.

Figure 12:
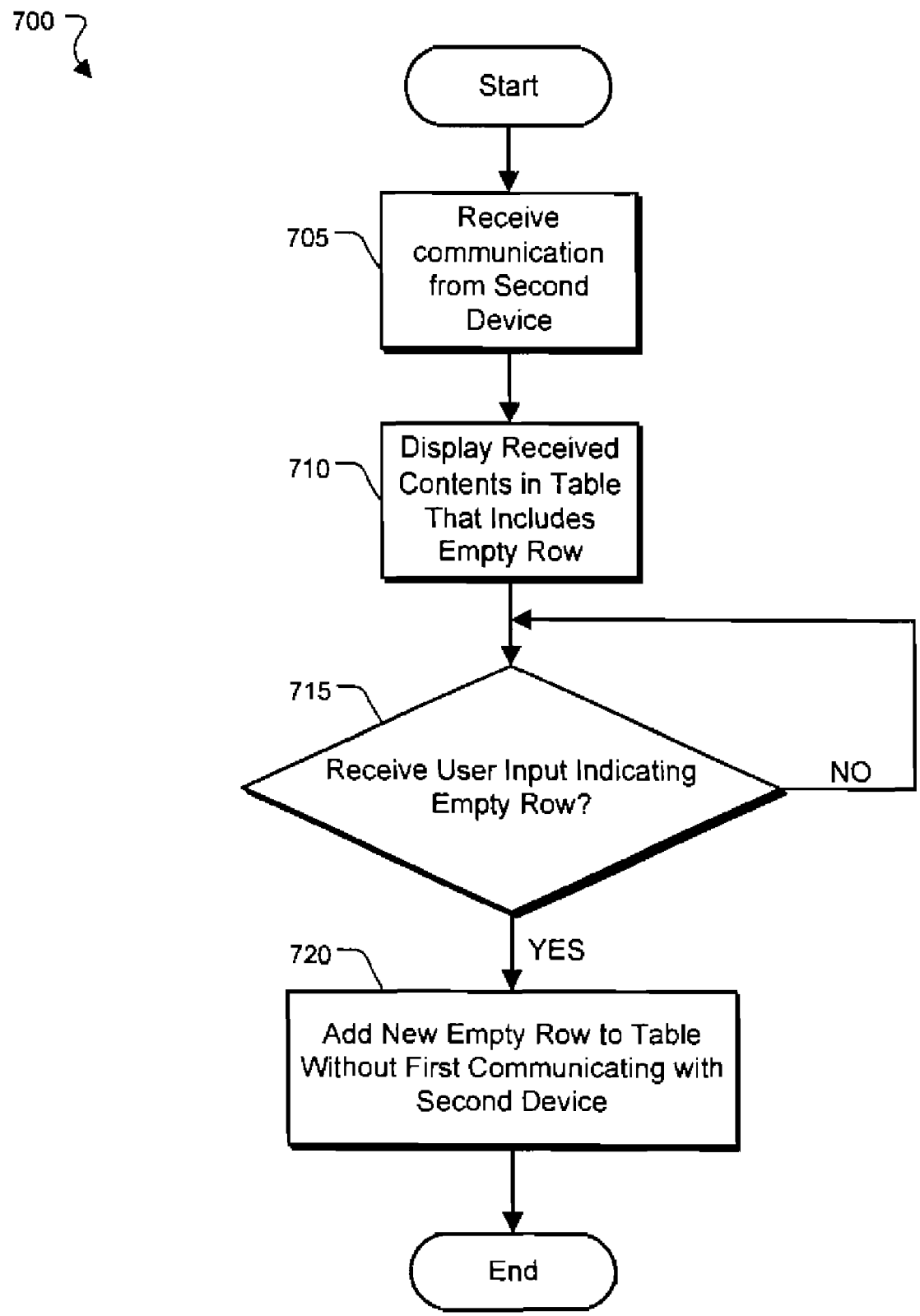
FIG. 12 shows exemplary operations that may be performed by the client device in the computing system of FIG. 1.

FIG. 12 is a flow chart 700 of exemplary operations that can be performed to modify an editable table without communicating with a remote device. For example, the operations can, at step 705, receive a communication at a first device from a second device. For example, the client 104 may receive an electronic communication from the server 101 over the network 106. The communication may include contents configured to be organized in a table, according to an implementation. Prior to sending the communication, the second device may retrieve the contents from a data repository, such as repository 107. The received contents may be displayed at step 710 in a table that includes an empty row. The table may be displayed on a user interface of the first device (i.e., the client 104 in this example), and the table may include multiple rows. One of the rows may be configured to remain empty while the table is displayed to indicate a possibility of adding at least one new row to the table, according to an implementation. For example, the table 924 with empty row 926 shown in FIG. 8 may be displayed on the client device 104.

At step 715, the process may wait for receipt of a user input that indicates the empty row while the table is displayed. During this step 715, the user may work with other rows in the table as well. A user may perform an operation in the user interface that indicates the empty row, such as selecting a field within the row or tabbing into the row, for example. When such an input is received, a new empty row may be added to the table without first communicating with the second device (i.e., the server 101 in this example) regarding the row addition at step 720. FIG. 9 shows an example of a table with a newly added empty row 962 following receipt of a user action that indicated the empty row 926 in the table of FIG. 8. The new row may be configured so that contents entered into the new row are to be added to the data repository in a subsequent communication to the second device. For example, the client 104 may send a communication to the server 101 that includes the contents entered into the new row 962, and the server 101 may store the contents to the data repository 107.

Figure 13:
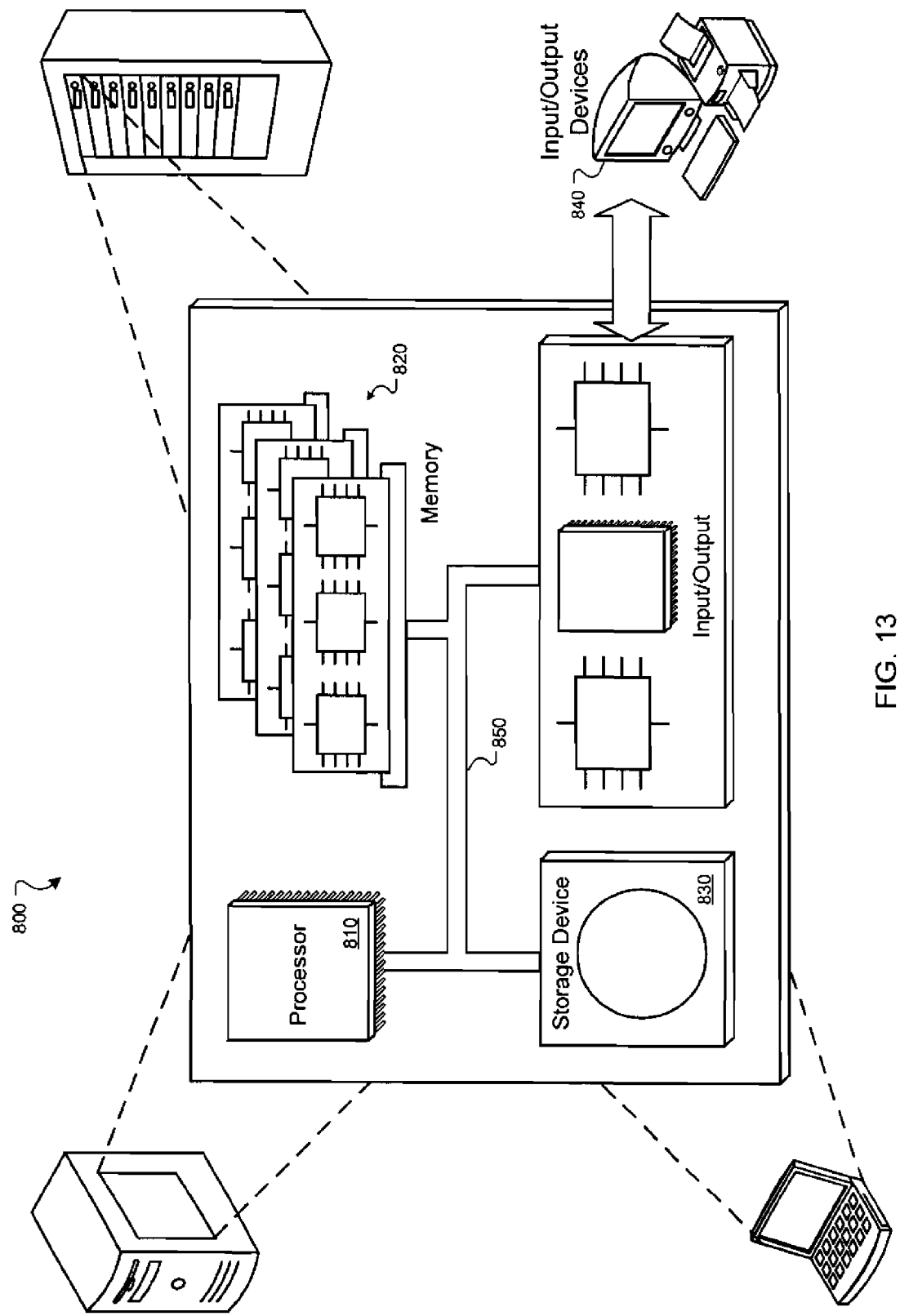
FIG. 13 is a block diagram of a computing system that can be used in connection with computer-implemented methods described in this document.

FIG. 13 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of modifying a visually displayed editable table of electronic database records without communicating with a remote computing device at which the electronic database records are stored, the method comprising:

receiving in a web-based application, an electronic input initiated by a user under guidance of a graphical user interface, the electronic input specifying a plurality of user-entered query portions to be used in performing a search to identify documents that are related to the plurality of user-entered query portions within an electronic data repository in an enterprise resource computing system;

performing a search query by searching the data repository for at least one of the plurality of user-entered query portions and presenting search results in the graphical user interface, wherein the search results identify one or more electronic database records within the data repository that include at least one of the plurality of user-entered query portions;

receiving in the web-based application, while the search results are displayed, a first user input selecting at least one identified electronic database record, and in response to receiving the first user input receiving, at a computing device and from the remote computing device, an electronic communication that includes contents comprising the at least one user-selected identified electronic database record, which contents are configured to be organized in a table configuration;

generating in the web-based application, at a video display device of the computing device, a visual display of the at least one user-selected electronic database record in a table structure and including the received contents within the table structure, the displayed table structure including multiple displayed rows each displaying information relating to a different one of the electronic database records stored at the remote computing device, and a single displayed empty row that does not contain any displayed information relating to a previously created database record;

receiving in the web-based application, while the visual display of the table structure is displayed, a second user input that causes a displayed indicator to be positioned within the empty row of the table structure to allow user entry within the empty row of information for a new database record;

invoking, in response to the second user input, instructions executing on the computing device capable of generating a new empty row in the displayed table structure; and in response to receiving the second user input that causes the displayed indicator to be positioned within the empty row of the table structure, generating a single new empty row to the displayed table structure without communicating with the remote computing device storing the displayed electronic database records, the generated new empty row not containing any displayed information relating to a previously created database record.

2. The computer-implemented method of claim 1, wherein the user input that causes the displayed indicator to be positioned within the empty row of the table structure is a selection of a field within the empty row.

3. The computer-implemented method of claim 1, wherein the user input that causes the displayed indicator to be positioned within the empty row of the table structure is a tab into the empty row.

4. The computer-implemented method of claim 1, wherein the user input that causes the displayed indicator to be positioned within the empty row of the table structure is a data keystroke entry within the empty row.

5. The computer-implemented method of claim 1, further comprising receiving information for a new database record into the empty row and sending a subsequent communication to the second device, the subsequent communication including the information for the new database record.

6. The computer-implemented method of claim 5, wherein the subsequent communication is sent to the second device in response to receiving, after the information for the new database record has been received into the empty row, a user input that indicates storing the table.

7. The computer-implemented method of claim 5, wherein the subsequent communication is sent to the second device in response to receiving, after the information for the new database record has been received into the empty row, a user input that indicates navigating away from the table.

8. A computer program product stored in a computer-readable storage medium and comprising instructions that when executed by a processor perform a method for modifying a visually displayed editable table of electronic database records without communicating with a remote computing device at which the electronic database records are stored, the method comprising:

receive in a web-based application, an electronic input initiated by a user under guidance of a graphical user interface, the electronic input specifying a plurality of user-entered query portions to be used in performing a search to identify documents that are related to the plurality of user-entered query portions within an electronic data repository in an enterprise resource computing system;

perform a search query by searching the data repository for at least one of the plurality of user-entered query portions and presenting search results in the graphical user interface, wherein the search results identify one or more electronic database records within the data repository that include at least one of the plurality of user-entered query portions;

receive in the web-based application, while the search results are displayed, a first user input selecting at least one identified electronic database record, and in response to receiving the first user input receive, at a computing device and from the remote computing device, an electronic communication that includes contents comprising the at least one user-selected identified electronic database record, which contents are configured to be organized in a table configuration;

generate in the web-based application, at a video display device of the computing device, a visual display of the at least one user-selected electronic database record in a table structure and including the received contents within the table structure, the displayed table structure including multiple displayed rows each displaying information relating to a different one of the electronic database records stored at the remote computing device, and a single displayed empty row that does not contain any displayed information relating to a previously created database record;

receive in the web-based application, while the visual display of the table structure is displayed, a second user input that causes a displayed indicator to be positioned within the empty row of the table structure to allow user entry within the empty row of information for a new database record;

invoke, in response to the second user input, instructions executing on the computing device capable of generating a new empty row in the displayed table structure; and in response to receiving the second user input that causes the displayed indicator to be positioned within the empty row of the table structure, generate a single new empty row to the displayed table structure without communicating with the remote computing device storing the displayed electronic database records, the generated new empty row not containing any displayed information relating to a previously created database record.

9. The computer program product of claim 8, wherein the user input that causes the displayed indicator to be positioned within the empty row of the table structure is a selection of a field within the empty row.

10. The computer program product of claim 8, wherein the user input that causes the displayed indicator to be positioned within the empty row of the table structure is a tab into the empty row.

11. The computer program product of claim 8, wherein the user input that causes the displayed indicator to be positioned within the empty row of the table structure is a data keystroke entry within the empty row.

12. The computer program product of claim 8, further comprising instructions that when executed by the processor receive information for a new database record into the empty row and send a subsequent communication to the second device, the subsequent communication including the information for the new database record.

13. The computer program product of claim 12, wherein the subsequent communication is sent to the second device in response to receiving, after the information for the new database record has been received into the empty row, a user input that indicates storing the table.

14. The computer program product of claim 12, wherein the subsequent communication is sent to the second device in response to receiving, after the information for the new database record has been received into the empty row, a user input that indicates navigating away from the table.

15. A computer program product stored in a computer-readable storage medium, the computer program product including instructions that, when executed, generate on a video display device a graphical user interface for modifying a visually displayed editable table of electronic database records without communicating with a remote computing device at which the electronic database records are stored, the graphical user interface comprising:

a search query interface of a web-based application in an enterprise resource computing system comprising:
(i) multiple input areas for receiving an electronic input initiated by a user under guidance of the graphical user interface, the electronic input specifying a plurality of user-entered query portions to be used in performing a search to identify documents that are related to the plurality of user-entered query portions within an electronic data repository in the enterprise resource computing system;
(ii) a visual display area for displaying search results from performing a search query by searching the data repository for at least one of the plurality of user-entered query portions, wherein the search results identify one or more electronic database records within the electronic data repository that include at least one of the plurality of user-entered query portions, and for receiving, in the web-based application and while the search results are displayed, a first user input selecting at least one identified electronic database record; and a visual display of a table structure, generated in the web-based application and at the video display device, comprising:
(i) multiple displayed rows of data received at a computing device in an electronic communication from the remote computing device in response to receiving the first user input, the data comprising the at least one user-selected identified electronic database record and having been retrieved from a data repository stored at the remote computing device, wherein the data in each of the rows relates to a different one of the electronic database records stored at the data repository; and
(ii) a single displayed empty row that does not contain any displayed information relating to a previously created database record;

wherein the graphical user interface is configured to receive, in the web-based application and while the visual display of the table structure is displayed, a second user input that causes a displayed indicator to be positioned within the empty row of the table structure to allow user entry within the empty row of information for a new database record, invoke, in response to the second user input, instructions executing on the computing device capable of generating a new empty row in the displayed table structure, and generate a single new empty row to the displayed table structure, in response to receiving the second user input that causes the displayed indicator to be positioned within the empty row of the table structure, without first communicating with the remote computing device storing the displayed electronic database records, the generated new empty row not containing any displayed information relating to a previously created database record.

16. A computing system comprising:

a computer-readable storage device that stores instructions; and at least one processor that when executing the instructions is configured to:

receive in a web-based application, an electronic input initiated by a user under guidance of a graphical user interface, the electronic input specifying a plurality of user-entered query portions to be used in performing a search to identify documents that are related to the plurality of user-entered query portions within an electronic data repository in the computing system;

perform a search query by searching the data repository for at least one of the plurality of user-entered query portions and present search results in the graphical user interface, wherein the search results identify one or more electronic database records within the data repository that include at least one of the plurality of user-entered query portions;

receive in the web-based application, while the search results are displayed, a first user input selecting at least one identified electronic database record, and in response to receiving the first user input receive, at a computing device and from the remote computing device, an electronic communication that includes contents comprising the at least one user-selected identified electronic database record, which contents are configured to be organized in a table configuration;

generate in the web-based application, at a video display device of the computing device, a visual display of the at least one user-selected electronic database record in a table structure and including the received contents within the table structure, the displayed table structure including multiple displayed rows each displaying information relating to a different one of the electronic database records stored at the remote computing device, and a single displayed empty row that does not contain any displayed information relating to a previously created database record;

receive in the web-based application, while the visual display of the table structure is displayed, a second user input that causes a displayed indicator to be positioned within the empty row of the table structure to allow user entry within the empty row of information for a new database record;

invoke, in response to the second user input, instructions executing on the computing device capable of generating a new empty row in the displayed table structure; and in response to receiving the second user input that causes the displayed indicator to be positioned within the empty row of the table structure, generate a single new empty row to the displayed table structure without communicating with the remote computing device storing the displayed electronic database records, the generated new empty row not containing any displayed information relating to a previously created database record.

* * * * *